(12) United States Patent
Wilkinson et al.

(10) Patent No.: US 11,605,044 B2
(45) Date of Patent: Mar. 14, 2023

(54) CROWDSOURCED DELIVERY BASED ON A SET OF REQUIREMENTS

(71) Applicant: Walmart Apollo, LLC, Bentonville, AR (US)

(72) Inventors: Bruce W. Wilkinson, Rogers, AR (US); Todd D. Mattingly, Bentonville, AR (US); John J. O'Brien, Farmington, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 288 days.

(21) Appl. No.: 15/854,651

(22) Filed: Dec. 26, 2017

(65) Prior Publication Data

US 2018/0181904 A1 Jun. 28, 2018

Related U.S. Application Data

(60) Provisional application No. 62/439,329, filed on Dec. 27, 2016.

(51) Int. Cl.
*G06Q 10/08* (2012.01)
*G06Q 10/083* (2023.01)
(Continued)

(52) U.S. Cl.
CPC ........... *G06Q 10/083* (2013.01); *G06Q 50/01* (2013.01); *H04L 9/0643* (2013.01);
(Continued)

(58) Field of Classification Search
CPC .... G06Q 10/083; G06Q 50/01; H04L 9/0643; H04L 9/3236; H04L 9/3297
(Continued)

(56) References Cited

U.S. PATENT DOCUMENTS

| | | |
|---|---|---|
| 6,195,005 B1 | 2/2001 | Maloney |
| 6,240,362 B1 | 5/2001 | Gaspard, II |

(Continued)

FOREIGN PATENT DOCUMENTS

| | | |
|---|---|---|
| DE | 10331356 | 2/2005 |
| JP | 2004307210 | 11/2004 |

(Continued)

OTHER PUBLICATIONS

Gross, June. "Air2Web Delivers Solution to UPS—Customers Wanted UPS to Go Wireless-Now Tracking Packages Is Its Killer App." VARbusiness 17.8 (2001): 34-PG34. Print. (Year: 2001).*

(Continued)

*Primary Examiner* — Akiba K Robinson
(74) *Attorney, Agent, or Firm* — Fitch, Even, Tabin & Flannery LLP

(57) ABSTRACT

In some embodiments, apparatuses and methods are provided herein useful to creating a crowdsourced delivery plan. In some embodiments, a system for creating a crowdsourced delivery plan for a package comprises a certification system configured to receive, from a retailer, an indication of items included in the package, determine, based on the indication of items included in the package, a set of requirements, and transmit, to a plurality of portable devices, information regarding the delivery, each of the plurality of portable devices configured to receive, from the certification system, the information regarding the delivery, transmit, to the certification system, an acceptance of the delivery, wherein only ones of the plurality of portable devices associated with delivery agents meeting the set of requirements is capable of acceptance of the delivery, receive, in response to the transmission of the acceptance, an authorization, and present, at a pickup point, the authorization.

22 Claims, 11 Drawing Sheets

(51) Int. Cl.
*H04L 9/06* (2006.01)
*G06Q 50/00* (2012.01)
*H04L 9/32* (2006.01)
*H04L 9/00* (2022.01)

(52) U.S. Cl.
CPC .......... *H04L 9/3236* (2013.01); *H04L 9/3297* (2013.01); *H04L 9/50* (2022.05)

(58) Field of Classification Search
USPC ................. 705/330, 332, 333, 337, 1.1, 7.11
See application file for complete search history.

(56) References Cited

U.S. PATENT DOCUMENTS

| | | | |
|---|---|---|---|
| 6,253,129 | B1 | 6/2001 | Jenkins |
| 6,385,537 | B2 | 5/2002 | Gaspard, II |
| 6,411,897 | B1 | 6/2002 | Gaspard, II |
| 6,806,807 | B2 | 10/2004 | Cayne |
| 7,113,071 | B2 | 9/2006 | Cayne |
| 7,257,552 | B1 | 8/2007 | Franco |
| 7,339,469 | B2 | 3/2008 | Braun |
| 7,840,427 | B2 | 11/2010 | O'Sullivan |
| 7,945,469 | B2 | 5/2011 | Cohen |
| 7,945,470 | B1 * | 5/2011 | Cohen ................... G06Q 10/06 705/7.13 |
| 8,160,972 | B1 | 4/2012 | Tannenbaum |
| 8,195,496 | B2 | 6/2012 | Gottlieb |
| 8,554,694 | B1 | 10/2013 | Ward |
| 8,560,461 | B1 | 10/2013 | Tian |
| 8,626,540 | B2 | 1/2014 | Peterkofsky |
| 9,066,206 | B2 | 6/2015 | Lin |
| 9,202,191 | B2 | 12/2015 | Bowen |
| 9,230,292 | B2 | 1/2016 | Amin |
| 9,230,372 | B2 | 1/2016 | Kadaba |
| 9,242,810 | B2 | 1/2016 | Lossov |
| 9,269,103 | B1 | 2/2016 | Kumar |
| 9,305,310 | B2 | 4/2016 | Radhakrishnan |
| 9,378,479 | B2 | 6/2016 | Seifen |
| 9,459,622 | B2 | 10/2016 | Abhyanker |
| 9,460,524 | B1 | 10/2016 | Curlander |
| 9,639,908 | B1 | 5/2017 | Reiss |
| 9,718,397 | B2 | 8/2017 | Kalanick |
| 9,721,224 | B2 | 8/2017 | Waris |
| 9,778,057 | B2 | 10/2017 | O'Mahony |
| 9,792,574 | B2 | 10/2017 | Lord |
| 9,805,536 | B2 | 10/2017 | Lutnick |
| 9,811,838 | B1 | 11/2017 | Daire |
| 9,852,551 | B2 | 12/2017 | Brinig |
| 9,902,310 | B2 | 2/2018 | Fournier |
| 9,904,900 | B2 | 2/2018 | Cao |
| 9,928,540 | B1 | 3/2018 | Gerard |
| 9,934,530 | B1 | 4/2018 | Iacono |
| 2002/0019759 | A1 | 2/2002 | Arunapuram |
| 2003/0040944 | A1 | 2/2003 | Hileman |
| 2003/0046173 | A1 | 3/2003 | Benjier |
| 2004/0015393 | A1 | 1/2004 | Fong |
| 2004/0069850 | A1 | 4/2004 | De Wilde |
| 2004/0075557 | A1 | 4/2004 | Selwyn |
| 2004/0236635 | A1 | 11/2004 | Publicover |
| 2006/0026030 | A1 | 2/2006 | Jacobs |
| 2006/0232412 | A1 | 10/2006 | Tabacman |
| 2007/0112647 | A1 | 5/2007 | Borders |
| 2007/0185598 | A1 | 8/2007 | Ortega |
| 2007/0192111 | A1 | 8/2007 | Chasen |
| 2008/0183526 | A1 | 7/2008 | Hancock |
| 2008/0189146 | A1 | 8/2008 | Salloum |
| 2009/0326808 | A1 | 12/2009 | Blanton |
| 2011/0059693 | A1 | 3/2011 | O'Sullivan |
| 2012/0030133 | A1 | 2/2012 | Rademaker |
| 2013/0144428 | A1 | 6/2013 | Irwin |
| 2014/0025524 | A1 | 1/2014 | Sims |
| 2014/0058902 | A1 | 2/2014 | Taylor |
| 2014/0164126 | A1 * | 6/2014 | Nicholas ................... A63F 9/24 705/14.58 |
| 2014/0229258 | A1 | 8/2014 | Seriani |
| 2014/0236856 | A1 | 8/2014 | Baykhurazov |
| 2014/0278634 | A1 | 9/2014 | Horvitz |
| 2014/0278851 | A1 | 9/2014 | Kopanati |
| 2014/0278875 | A1 | 9/2014 | Ganesh |
| 2014/0330428 | A1 | 11/2014 | Wolfe |
| 2015/0046298 | A1 | 2/2015 | Zwakhals |
| 2015/0081360 | A1 | 3/2015 | Sun |
| 2015/0081581 | A1 | 3/2015 | Gishen |
| 2015/0094876 | A1 | 4/2015 | Baldwin |
| 2015/0106292 | A1 | 4/2015 | Robinson |
| 2015/0161563 | A1 | 6/2015 | Mehrabi |
| 2015/0199632 | A1 | 7/2015 | Chander |
| 2015/0206093 | A1 | 7/2015 | Trew |
| 2015/0227890 | A1 | 8/2015 | Bednarek |
| 2015/0242829 | A1 | 8/2015 | Bhaskaran |
| 2015/0310388 | A1 | 10/2015 | Jamthe |
| 2015/0339625 | A1 | 11/2015 | Agasti |
| 2015/0347961 | A1 | 12/2015 | Gillen |
| 2015/0348173 | A1 | 12/2015 | Gillen |
| 2015/0363843 | A1 | 12/2015 | Loppatto |
| 2016/0012391 | A1 | 1/2016 | Burnett |
| 2016/0019669 | A1 | 1/2016 | Gopalakrishnan |
| 2016/0048804 | A1 | 2/2016 | Paul |
| 2016/0071056 | A1 | 3/2016 | Ellison |
| 2016/0078394 | A1 | 3/2016 | Fuldner |
| 2016/0086128 | A1 | 3/2016 | Geiger |
| 2016/0096508 | A1 | 4/2016 | Oz |
| 2016/0104112 | A1 | 4/2016 | Gorlin |
| 2016/0104113 | A1 * | 4/2016 | Gorlin .............. G06Q 10/08355 705/338 |
| 2016/0155072 | A1 | 6/2016 | Prodromidis |
| 2016/0180274 | A1 | 6/2016 | Zwakhals |
| 2016/0189098 | A1 | 6/2016 | Beaurepaire |
| 2016/0195404 | A1 | 7/2016 | Prasad |
| 2016/0210591 | A1 | 7/2016 | Lafrance |
| 2016/0225115 | A1 | 8/2016 | Levy |
| 2016/0282466 | A1 | 9/2016 | Epler |
| 2016/0328678 | A1 | 11/2016 | Gillen |
| 2016/0350701 | A1 | 12/2016 | Brehm |
| 2016/0364678 | A1 | 12/2016 | Cao |
| 2016/0364679 | A1 | 12/2016 | Cao |
| 2016/0364812 | A1 | 12/2016 | Cao |
| 2016/0364823 | A1 | 12/2016 | Cao |
| 2016/0379167 | A1 | 12/2016 | Raman |
| 2017/0032341 | A1 | 2/2017 | Johnsrud |
| 2017/0083862 | A1 | 3/2017 | Loubriel |
| 2017/0089710 | A1 | 3/2017 | Slusar |
| 2017/0091891 | A1 | 3/2017 | Van Der Berg |
| 2017/0124510 | A1 | 5/2017 | Catering |
| 2017/0140326 | A1 | 5/2017 | Rhyu |
| 2017/0220966 | A1 * | 8/2017 | Wang ..................... G06Q 50/30 |
| 2017/0236088 | A1 * | 8/2017 | Rao ........................ G06Q 10/10 705/7.17 |
| 2017/0310770 | A1 | 10/2017 | Samaan |
| 2017/0351994 | A1 | 12/2017 | Waris |
| 2018/0096414 | A1 | 4/2018 | Iacono |
| 2018/0174087 | A1 | 6/2018 | Wilkinson |
| 2018/0174262 | A1 | 6/2018 | Wilkinson |
| 2018/0365638 | A1 | 12/2018 | Chen |
| 2019/0066251 | A1 * | 2/2019 | Samocha ............. G06Q 10/083 |

FOREIGN PATENT DOCUMENTS

| | | |
|---|---|---|
| WO | 2000008287 | 2/2000 |
| WO | 2001075746 | 10/2001 |
| WO | 2015084688 A1 | 6/2015 |

OTHER PUBLICATIONS

PCT; App. No. PCT/US2017/068400; International Search Report and Written Opinion dated Mar. 29, 2018.
U.S. Appl. No. 15/843,817, filed Dec. 15, 2017, Bruce W. Wilkinson.
U.S. Appl. No. 15/843,857, filed Dec. 15, 2017, Bruce W. Wilkinson.
PCT; App. No. PCT/US2017/066589; International Search Report and Written Opinion dated Mar. 7, 2018.
PCT; App. No. PCT/US2017/066593; International Search Report and Written Opinion dated Mar. 8, 2018.

(56) References Cited

OTHER PUBLICATIONS

USPTO; U.S. Appl. No. 15/843,857; Office Action dated Jun. 23, 2021; (pp. 1-35).
USPTO; U.S. Appl. No. 15/843,817; Office Action dated May 19, 2020, (pp. 1-33).
USPTO; U.S. Appl. No. 15/843,817; Office Action dated Dec. 20, 2019; (pp. 1-25).
USPTO; U.S. Appl. No. 15/843,857; Office Action dated Jan. 14, 2021; (pp. 1-39).
USPTO; U.S. Appl. No. 15/843,857; Office Action dated Mar. 17, 2020; (pp. 1-6).
USPTO; U.S. Appl. No. 15/843,857; Office Action dated Sep. 25, 2020; (pp. 1-32).
USPTO; U.S. Appl. No. 15/843,857; Final Rejection dated Mar. 1, 2022; (pp. 1-38).

\* cited by examiner

CROWDSOURCED DELIVERY BASED ON A SET OF REQUIREMENTS

CROSS-REFERENCE TO RELATED APPLICATION

This application claims the benefit of U.S. Provisional Application No. 62/439,329, filed Dec. 27, 2016, which is incorporated by reference in its entirety herein.

TECHNICAL FIELD

This invention relates generally to package delivery and, more specifically, to crowdsourced package delivery.

BACKGROUND

As an increasing number of customers shop remotely (e.g., online or over the phone), the number of packages delivered by retailers increases. Package delivery is not an insignificant cost to retailers. While retailers might prefer to pass these delivery costs on to the customers, customers often expect free or low-cost shipping options. Consequently, to remain competitive and encourage customers to shop more frequently, whether in a brick-and-mortar facility or remotely, retailers are seeking new low-cost shipping options. One such option is crowdsourced delivery. Crowdsourced delivery however poses problems that shipping with established carriers does not. For example, while it may be safe to assume that all employees of established carriers have proper certifications to deliver packages containing regulated or controlled items, such an assumption may not be as well-founded with crowdsourced delivery agents. Consequently, a need exists for a system that can create delivery plans with crowdsourced delivery agents which ensures that the crowdsourced delivery agents have the proper certifications.

BRIEF DESCRIPTION OF THE DRAWINGS

Disclosed herein are embodiments of systems, apparatuses and methods pertaining to creating a crowdsourced delivery plan. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to creating a crowdsourced delivery plan. In some embodiments, a system for creating a crowdsourced delivery plan for a package comprises a certification system, the certification system configured to receive, from a retailer, an indication of items included in the package, determine, based on the indication of items included in the package, a set of requirements, and transmit, to a plurality of portable devices, information regarding the delivery, each of the plurality of portable devices configured to receive, from the certification system, the information regarding the delivery, transmit, to the certification system, an acceptance of the delivery, wherein only ones of the plurality of portable devices associated with delivery agents meeting the set of requirements is capable of acceptance of the delivery, receive, in response to the transmission of the acceptance of the delivery, an authorization, and present, at a pickup point, the authorization.

Figure 1:
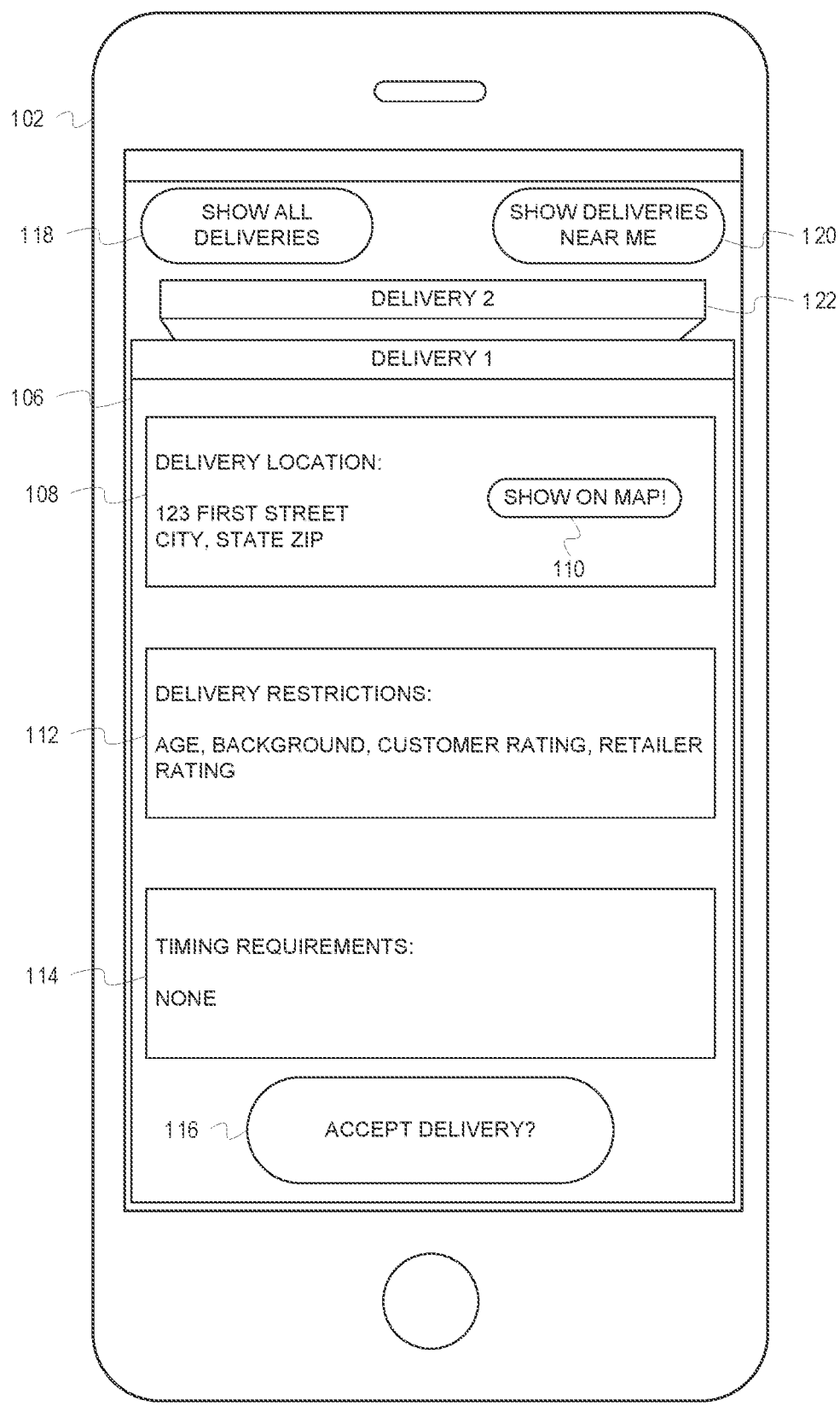
FIG. 1 depicts a portable device 102 presenting a user interface for a crowdsource delivery agent, according to some embodiments.
Figure 8:
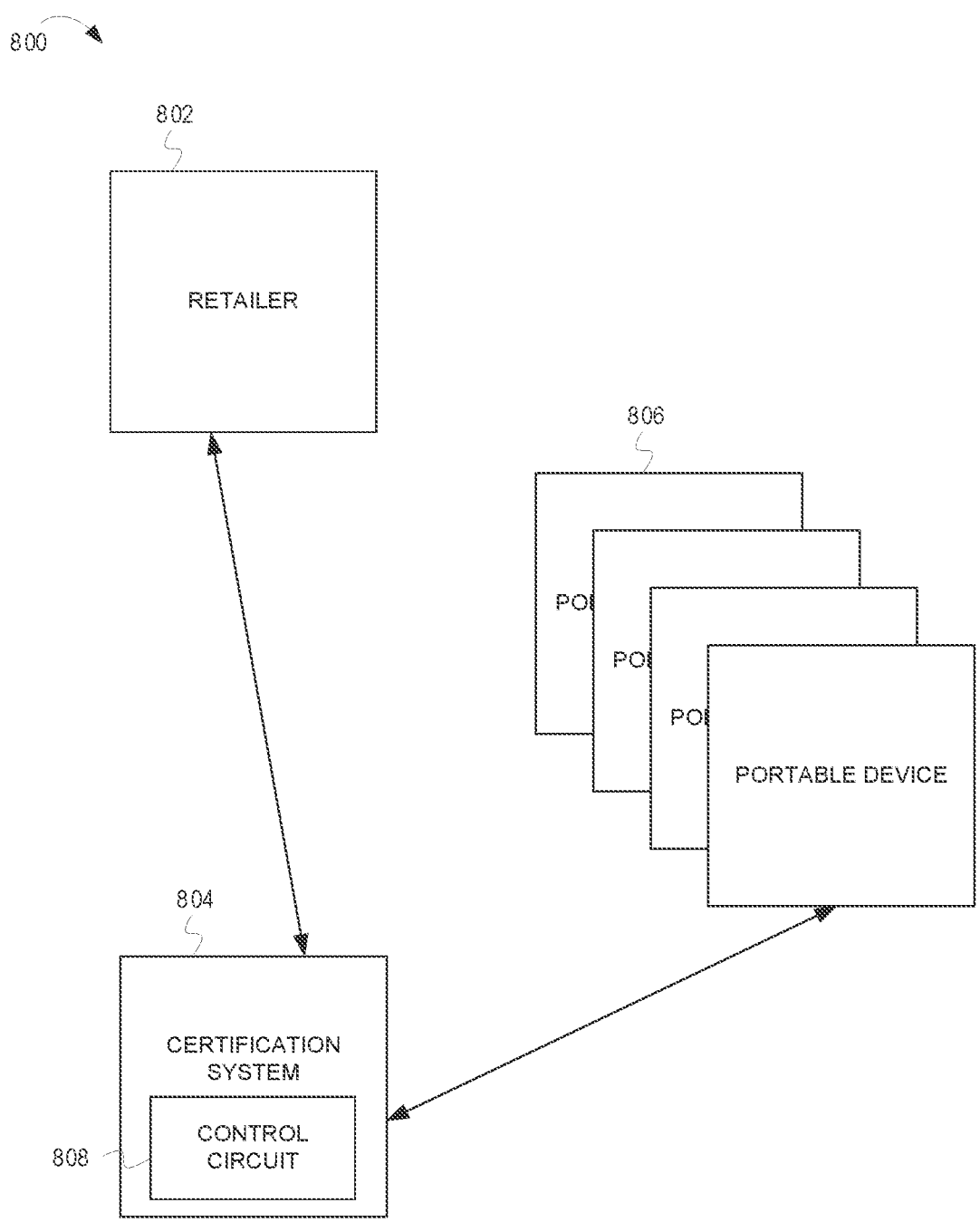
FIG. 8 is a block diagram of a system 800 for creating a crowdsourced delivery plan, according to some embodiments.
Figure 9:
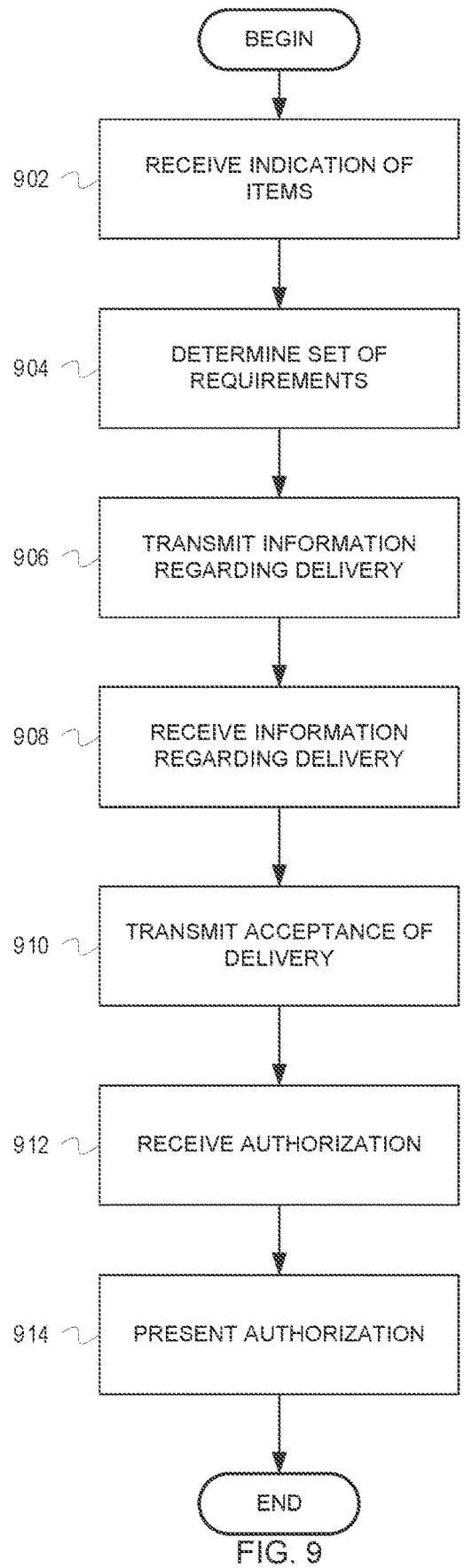
FIG. 9 is a flow diagram including example operations for creating a crowdsourced delivery plan, according to some embodiments.

As previously discussed, the frequency with which customers shop remotely is increasing. Accordingly, shipping costs for retailers are increasing with the increased number of packages that must be delivered to the customers shopping remotely. While crowdsourced delivery may decrease some of these costs, it also poses new problems. For example, state or federal law may require that a delivery agent have certain certifications to deliver regulated items, such as alcohol, pharmaceuticals, firearms, etc. While established carriers (e.g., USPS, UPS, FedEx, etc.) may have plans and contingencies in place for delivery of such items, crowdsourced systems and methods lack many of these controls. Accordingly, embodiments described herein seek to minimize or eliminate these issues via a system that determines a set of requirements for delivery and ensures that only those crowdsourced delivery agents meeting those requirements are able to deliver the packages. The discussion of FIG. 1 provides an introduction to a system for creating a crowdsourced delivery plan for a package. In some embodiments, the system utilizes blockchain to maintain a list of certifications for delivery agents. Descriptions of some embodiments of blockchain technology are provided with reference to FIGS. 2-7 herein. Blockchain technology may be utilized to maintain a record of certifications for delivery agents. One or more of the certification systems described herein may comprise a node in a distributed blockchain system storing a copy of the blockchain record. Updates to the blockchain may comprise the transfer and/or recordation of certifications and one or more nodes on the system may be configured to incorporate one or more updates into blocks to add to the distributed database. The discussion of FIGS. 8-9 provides additional details regarding a system for creating a crowdsourced delivery plan for a package.

Introduction:

FIG. 1 depicts a portable device 102 presenting a user interface for a crowdsource delivery agent, according to some embodiments. While FIG. 1 depicts the portable device 102 as a cellular phone, the portable device can be any suitable device (e.g., a computer, tablet, a dedicated device, etc.). The user interface is part of a system for creating a crowdsourced delivery plan for a package. When a retailer wants to find a crowdsourced delivery agent to deliver a package, the retailer transmits a notification to the system. The portable device 102 presents potential deliveries, from which a delivery agent can accept one or more of the potential deliveries. After accepting the delivery, the delivery agent receives an authorization on the portable device 102. The authorization can be a visual, audible, or transmittable code (e.g., via nearfield communication). In some embodiments, pickup of the package is automated such that the delivery agent simply presents the authorization at a pickup point and the package is delivered to the delivery agent.

Before the system presents delivery opportunities to delivery agents, the retailer transmits a notification informing the system of the delivery. The notification includes information regarding the package (i.e., the package to be delivered). The information can include an indication of items included in the package, as well as other delivery instructions, such as an address, timing requirements, etc. The items in the package may have restrictions on delivery agents that can deliver the package. The restrictions can be set by retailer policy, law, or any other suitable source. For example, if one of the items in the package is a firearm, the retailer, or law, may require that the person delivering the package have certain certifications, such as not being a convicted felon or having a special license (e.g., a license to carry a firearm or a license to deliver a firearm). The certifications can be of any suitable type or quality, such as age (i.e., age of the delivery agent), ratings (e.g., ratings received by previous customers, retailers, or certification systems), ability to use the item (e.g., a certification that the delivery agent is capable of demonstrating use of the item), ability to install the item (e.g., a certification that the delivery agent is capable of installing the item), criminal history, medical history, education, type of vehicle used for delivery, length of delivery experience, etc. As discussed in more detail with regard to FIGS. 2-7, the system can store credentials, as well as delivery agent identities, in a blockchain format.

After receiving the indication of the items included in the package, the system determines a set of requirements for the delivery agent. As discussed in more detail below, dependent upon the embodiment, the certification system or the portable device 102 determines the set of requirements. The set of requirements is dependent upon the items in the package and specifies the type(s), if any, of certification required of the delivery agent. In either embodiment, the delivery agent associated with the portable device 102 is only capable of accepting the delivery if the delivery agent associated with the portable device 102 meets the set of requirements. For example, the certification may only transmit potential deliveries to portable devices associated with delivery agents that meet the set of requirements, or the portable device 102 may only present potential deliveries for which the delivery agent associated with the portable device 102 meets the set of requirements. The delivery agent can view and select deliveries via the portable device 102.

The user interface presented by the portable device 102 depicted in FIG. 1 is but an example of one suitable user interface. The user interface can have a different appearance and/or have greater, or fewer, features than the user interface depicted in FIG. 1. The user interface depicted in FIG. 1, includes windows for potential deliveries. As depicted in FIG. 1, the user interface includes a first window 106 for a first potential delivery ("Delivery 1") and a second window 122 for a second potential delivery ("Delivery 2"). The first window 106 is in the foreground and provides information and options related to the first potential delivery. Specifically, the first window 106 includes address information 108, including a map option 110 to show the address on a map, restriction information 112 (i.e., the set of requirements required to deliver the package), timing requirements 114, and an accept option 116 (the selection of which accepts the delivery). The delivery agent can select the second window 122 to bring the second window 122, and the information and options related to the second potential delivery, to the foreground. The user interface also includes an "all deliveries" button 118 and a "deliveries near me" button 120. Selection of the "all deliveries" button 118 shows all potential deliveries, for example, in a grid, on a map, etc. Selection of the "deliveries near me" button 120 shows all deliveries near the portable device 102, for example, in a grid, on a map, etc.

While the discussion of FIG. 1 provides an introduction to a system for creating crowdsource delivery plans, the discussion of FIGS. 2-7 provides additional detail regarding blockchain.

Blockchain Technology:

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 2:
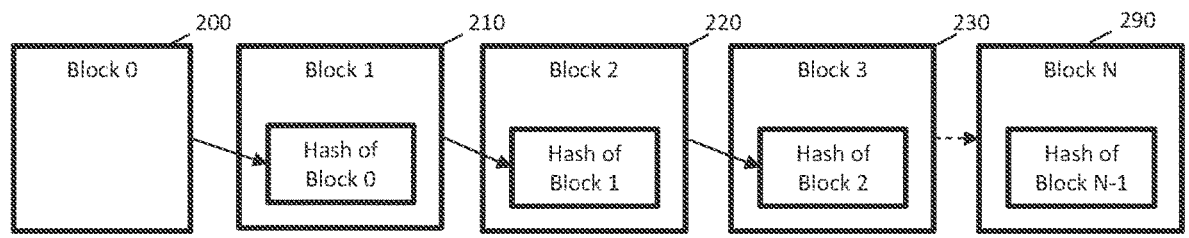
FIG. 2 depicts an illustration of blocks, according to some embodiments.

Now referring to FIG. 2, an illustration of a blockchain according to some embodiments is shown. In some embodiments, a blockchain comprises a hash chain or a hash tree in which each block added in the chain contains a hash of the previous block. In FIG. 2, block 0 200 represents a genesis block of the chain. Block 1 210 contains a hash of block 0 200, block 2 220 contains a hash of block 1 210, block 3 230 contains a hash of block 2 220, and so forth. Continuing down the chain, block N 290 contains a hash of block N−1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners" are nodes that compete to provide proof-of-work to form a new block, and the first successful miner of a new block earns Bitcoin currency in return.

Figure 3:
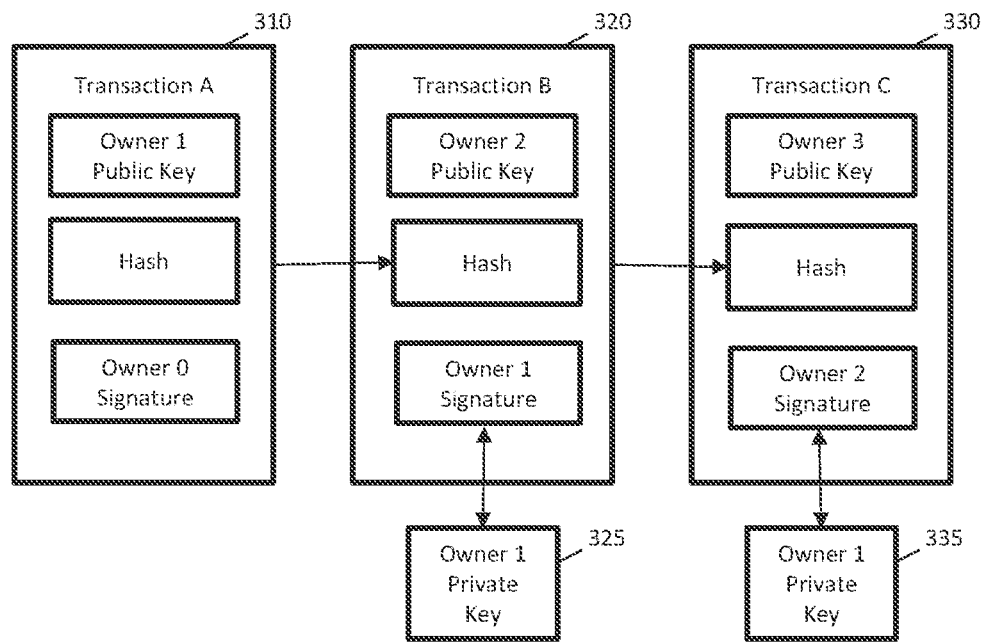
FIG. 3 depicts an illustration of transactions, according to some embodiments.

Now referring to FIG. 3, an illustration of blockchain-based transactions according to some embodiments is shown. In some embodiments, the blockchain illustrated in FIG. 3 comprises a hash chain protected by private/public key encryption. Transaction A 310 represents a transaction recorded in a block of a blockchain showing that owner 1 (recipient) obtained an asset from owner 0 (sender). Transaction A 310 contains owner's 1 public key and owner 0's signature for the transaction and a hash of a previous block. When owner 1 transfers the asset to owner 2, a block containing transaction B 320 is formed. The record of transaction B 320 comprises the public key of owner 2 (recipient), a hash of the previous block, and owner 1's signature for the transaction that is signed with the owner 1's private key 325 and verified using owner 1's public key in transaction A 310. When owner 2 transfers the asset to owner 3, a block containing transaction C 330 is formed. The record of transaction C 330 comprises the public key of owner 3 (recipient), a hash of the previous block, and owner 2's signature for the transaction that is signed by owner 2's private key 335 and verified using owner 2's public key from transaction B 220. In some embodiments, when each transaction record is created, the system may check previous transaction records and the current owner's private and public key signature to determine whether the transaction is valid. In some embodiments, transactions are be broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 3 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 4:
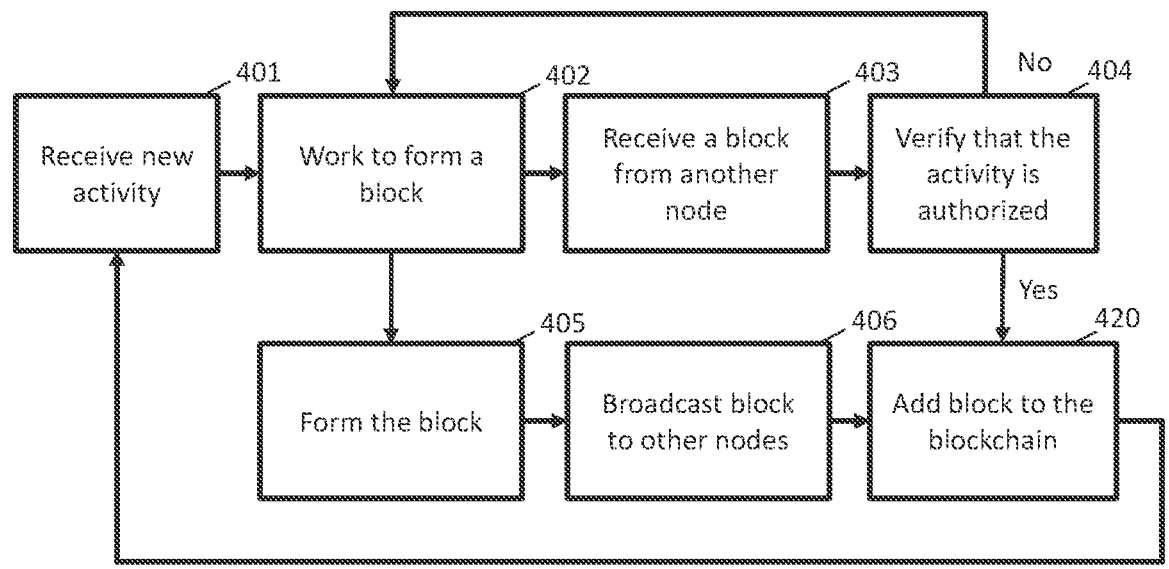
FIG. 4 depicts a flow diagram, according to some embodiments.

Now referring to FIG. 4, a flow diagram according to some embodiments is shown. In some embodiments, the steps shown in FIG. 4 may be performed by a processor-based device, such as a computer system, a server, a distributed server, a timestamp server, a blockchain node, and the like. In some embodiments, the steps in FIG. 4 may be performed by one or more of the nodes in a system using blockchain for record keeping.

In step 401, a node receives a new activity. The new activity may comprise an update to the record being kept in the form of a blockchain. In some embodiments, for blockchain supported digital or physical asset record keeping, the new activity may comprise a asset transaction. In some embodiments, the new activity may be broadcasted to a plurality of nodes on the network prior to step 401. In step 402, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 402, if the node successfully forms a block in step 405 prior to receiving a block from another node, the node broadcasts the block to other nodes over the network in step 406. In some embodiments, in a system with incentive features, the first node to form a block may be permitted to add incentive payment to itself in the newly formed block. In step 420, the node then adds the block to its copy of the blockchain. In the event that the node receives a block formed by another node in step 403 prior to being able to form the block, the node works to verify that the activity recorded in the received block is authorized in step 404. In some embodiments, the node may further check the new block against system consensus rules for blocks and activities to verify whether the block is properly formed. If the new block is not authorized, the node may reject the block update and return to step 402 to continue to work to form the block. If the new block is verified by the node, the node may express its approval by adding the received block to its copy of the blockchain in step 420. After a block is added, the node then returns to step 401 to form the next block using the newly extended blockchain for the hash in the new block.

In some embodiments, in the event one or more blocks having the same block number is received after step 420, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 401.

Figure 5:
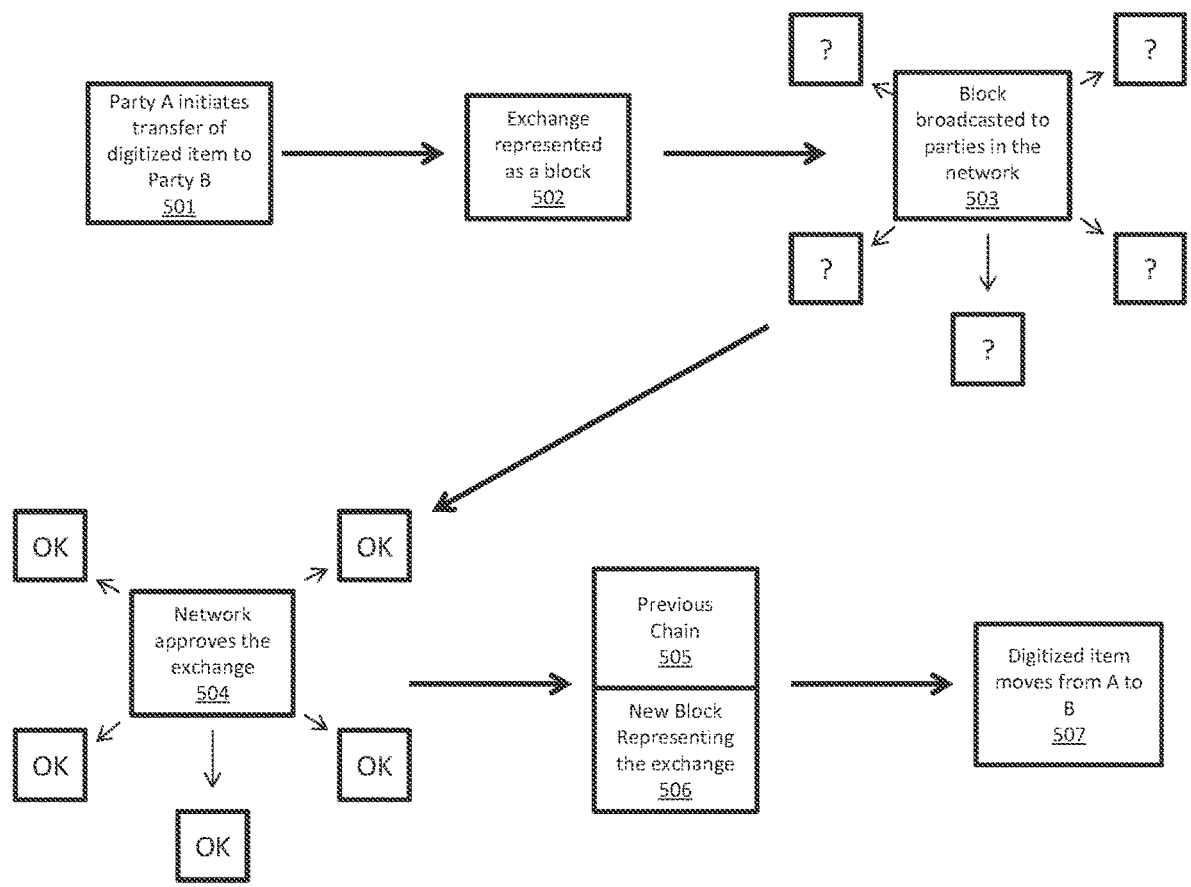
FIG. 5 depicts a process diagram, according to some embodiments.

Now referring to FIG. 5, a process diagram a blockchain update according to some implementations in shown. In step 501, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 502, the exchange initiated in step 501 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide prove of work to for block the may earn a Bitcoin. In some embodiments, a block may comprise one or more transactions between different parties that are broadcasted to the nodes. In step 503, the block is broadcasted to parties in the network. In step 504, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she s seeks to transfer). In some embodiments, a block may be approved with consensus of the nodes in the network. After a block is approved, the new block 506 representing the exchange is added to the existing chain 505 comprising blocks that chronologically precede the new block 506. The new block 506 may contain the transaction(s) and a hash of one or more blocks in the existing chain 505. In some embodiments, each node may then update their copy of the blockchain with the new block and continue to work on extending the chain with additional transactions. In step 507, when the chain is updated with the new block, the digitized item is moved from party A to party B.

Figure 6:
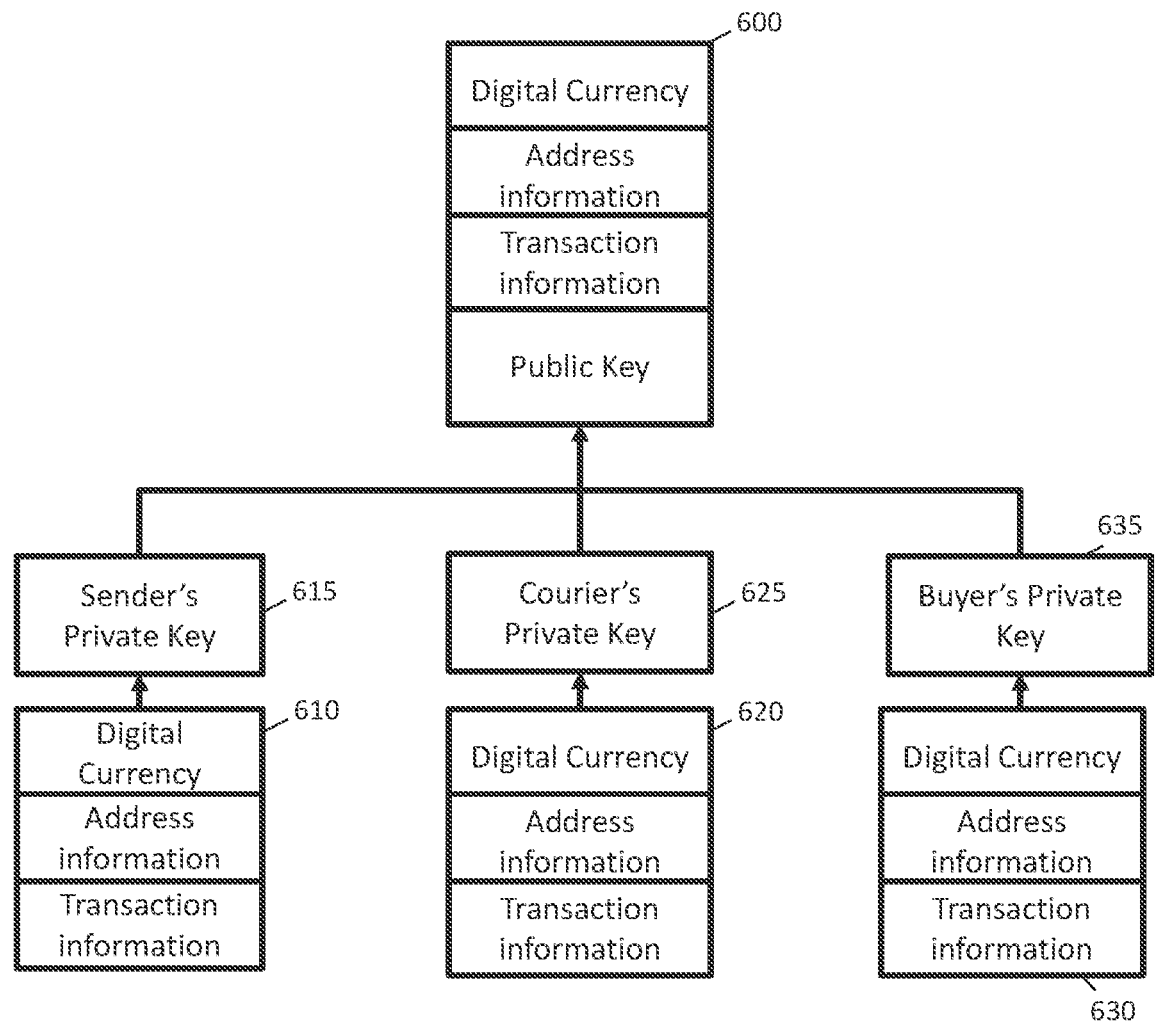
FIG. 6 depicts an illustration of a delivery record, according to some embodiments.

Now referring to FIG. 6, a diagram of a blockchain according to some embodiments in shown. FIG. 6 comprises an example of an implementation of a blockchain system for delivery service record keeping. The delivery record 600 comprises digital currency information, address information, transaction information, and a public key associated with one or more of a sender, a courier, and a buyer. In some embodiments, nodes associated the sender, the courier, and the buyer may each store a copy of the delivery record 610, 620, and 630 respectively. In some embodiments, the delivery record 600 comprises a public key that allows the sender, the courier, and/or the buyer to view and/or update the delivery record 600 using their private keys 615, 625, and the 635 respectively. For example, when a package is transferred from a sender to the courier, the sender may use the sender's private key 615 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 625 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 6, the delivery record may be updated by one or more of the sender, courier, and the buyer to form a record of the transaction without a trusted third party while preventing unauthorized modifications to the record. In some embodiments, the blockchain based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 7:
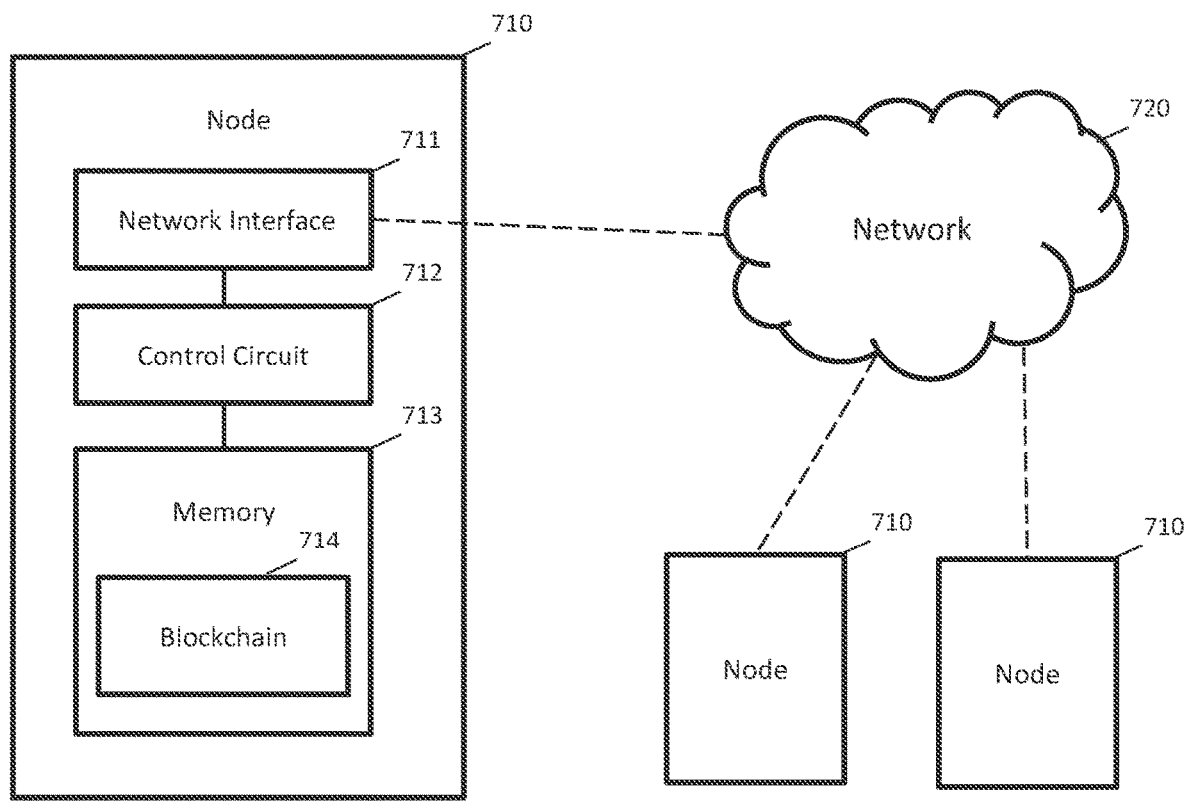
FIG. 7 depicts a system diagram configured, according to some embodiments.

Now referring to FIG. 7, a system according to some embodiments is shown. A distributed blockchain system comprises a plurality of nodes 710710 communicating over a network 720. In some embodiments, the nodes 710710 may be comprise a distributed blockchain server and/or a distributed timestamp server. In some embodiments, one or more nodes 710710 may comprise or be similar to a "miner" device on the Bitcoin network. Each node 710710 in the system comprises a network interface 711, a control circuit 712, and a memory 713.

The control circuit 712 may comprise a processor, a microprocessor, and the like and may be configured to execute computer readable instructions stored on a computer readable storage memory 713. The computer readable storage memory may comprise volatile and/or non-volatile memory and have stored upon it a set of computer readable instructions which, when executed by the control circuit 712, causes the node 710710 update the blockchain 714 stored in the memory 713 based on communications with other nodes 710710 over the network 720. In some embodiments, the control circuit 712 may further be configured to extend the blockchain 714 by processing updates to form new blocks for the blockchain 714. Generally, each node may store a version of the blockchain 714, and together, may form a distributed database. In some embodiments, each node 710710 may be configured to perform one or more steps described with reference to FIGS. 6-7 herein.

The network interface 711 may comprise one or more network devices configured to allow the control circuit to receive and transmit information via the network 720. In some embodiments, the network interface 711 may comprise one or more of a network adapter, a modem, a router, a data port, a transceiver, and the like. The network 720 may comprise a communication network configured to allow one or more nodes 710710 to exchange data. In some embodiments, the network 720 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain")

that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

While the discussion of FIGS. 2-7 provides additional detail regarding blockchain technology, the discussion of FIG. 8 describes a system for creating a crowdsourced delivery plan.

Additional Details Regarding a System for Creating Crowdsourced Delivery Plans:

FIG. 8 is a block diagram of a system 800 for creating a crowdsourced delivery plan, according to some embodiments. The system 800 includes a retailer 802 (or multiple retailers), a certification system 804 (or multiple certification systems), and portable devices 806. The certification system 804 can be backend system that includes one or more control circuits 808. The control circuit 808 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 808 is configured (for example, by using corresponding programming as will be well understood by those skilled in the art) to carry out one or more of the steps, actions, and/or functions described herein.

By one optional approach the control circuit 808 operably couples to a memory. The memory may be integral to the control circuit 808 or can be physically discrete (in whole or in part) from the control circuit 808 as desired. This memory can also be local with respect to the control circuit 808 (where, for example, both share a common circuit board, chassis, power supply, and/or housing) or can be partially or wholly remote with respect to the control circuit 808 (where, for example, the memory is physically located in another facility, metropolitan area, or even country as compared to the control circuit 808).

This memory can serve, for example, to non-transitorily store the computer instructions that, when executed by the control circuit 808, cause the control circuit 808 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

When the retailer 802 wishes to ship a package via crowdsourced delivery agent, the retailer 802 transmits a notification to the certification system 804. The notification contains an indication of items included in the package. Additionally, the notification can include other delivery information, such as delivery addresses, delivery instructions, timing requirements, retailer and/or customer preferences, etc. The certification system 804 transmits this information, as information regarding the delivery, to the portable devices 806.

In a first embodiment, the certification system 804 ensures that only delivery agents capable of delivering the package (i.e., those that meet the set of requirements for the package) can accept the delivery. In such embodiments, the certification system 804 determines a set of requirements. The set of requirements is based on the items included in the package and indicate the certifications required of the delivery agent. After determining the set of requirements, the certification system 804 transmits the information regarding the delivery only to ones of the portable devices 806 that are associated with delivery agents meeting the set of requirements. Accordingly, only the ones of the portable devices 806 that are associated with delivery agents that meet the set of requirements will receive the information. Because only the ones of the portable devices 806 that are associated with delivery agents that meet the set of requirements will receive the information, only delivery agents that meet the set of requirements can accept the delivery. The certification system 804 determines which delivery agents (and associated portable devices 806) are capable of delivering the package by referencing a list, or in some embodiments, a blockchain, or both. For example, the list can include indications of delivery agents and associated portable devices 806 and the blockchain can include certifications for each of the delivery agents.

In a second embodiment, the certification system transmits the information regarding the delivery to all of the portable devices 806. In such embodiments, the portable devices 806 ensure that only delivery agents meeting the set of requirements can accept the delivery. That is, an application running on the portable devices 806 ensures that only delivery agents meeting the set of requirements can accept the delivery. The portable devices 806, after receiving the information regarding the delivery, determine whether the delivery agent associated with the portable device 806 is capable of delivering the package. For example, the portable devices 806 can reference a list or blockchain to determine if the delivery agent associated with the portable device 806 meets the set of requirements. The portable devices 806 can prevent delivery agents that are not capable of delivering the package from accepting the delivery in any suitable manner. For example, the portable devices 806 may only present the delivery to the delivery agents that are capable of delivering the package (i.e., if a delivery agent does not meet the set of requirements, the portable device 806 associated with the delivery agent will not present the potential delivery), can make deliveries for which delivery agents are not capable unselectable, etc.

After receiving the information regarding the delivery, the portable devices 806 presents the potential deliveries to the delivery agents. As one example, the portable devices 806 can present the potential deliveries to the delivery agents via a user interface, such as a touchscreen graphical user interface (GUI). An application running on the portable devices 806 can generate the user interface. From the user interface, the delivery agents can view different potential deliveries, view information about the potential deliveries, and accept potential deliveries. When a delivery agent selects a potential delivery, the portable device 806 transmits an acceptance of the delivery. The portable device 806 can transmit the acceptance of the delivery to the certification system 804 and/or the retailer 802.

After transmitting the acceptance, the portable device 806 receives an authorization. The portable device 806 receives the authorization from the certification system 804 and/or the retailer 802, dependent upon where the acceptance was sent. The authorization is a code or identifier that allows the delivery agent to retrieve the package. For example, the authorization can be a code (an alphabetic code, a numeric code, an alphanumeric code, a two- or three-dimensional barcode (i.e., a quick response ("QR") code), an auditory code, or a transmittable code (e.g., a radiofrequency ("RF") code). The authorization can include information identifying the delivery agent, the retailer, certifications required to deliver the package, delivery information for the package, etc. Additionally, the authorization can be unique to the delivery agent and/or the portable device 806 so that only a portable device 806 containing the correct authorization can retrieve the package. In some embodiments, the authorizations can also be tracked in a blockchain.

While the discussion of FIG. 8 provides additional information regarding a system for creating a crowdsourced delivery plan, the discussion FIG. 9 describes example operations for creating a crowdsourced delivery plan.

FIG. 9 is a flow diagram including example operations for creating a crowdsourced delivery plan, according to some embodiments. The flow continues at block 902.

At block 902, an indication of items in a package is received. For example, a system comprising a certification system and portable devices can receive the indication of the items. Specifically, the certification system can receive the indication of the items from a retailer seeking a crowdsourced delivery agent. The indication of the items can be included in a notification of a delivery request. In addition to the indication of the items, the certification system can receive delivery information, such as addresses, timing requirements, delivery instructions, etc. The flow continues at block 904.

At block 904, a set of requirements is determined. For example, the certification system and/or portable devices can determine the set of requirements. The system determines the set of requirements based on the items included in the package. The set of requirements is based on certifications required to deliver the items in the package. The certifications can be of any suitable type or quality, such as age (i.e., age of the delivery agent), ratings (e.g., ratings received by previous customers, retailers, or certification systems), ability to use the item (e.g., a certification that the delivery agent is capable of demonstrating use of the item), ability to install the item (e.g., a certification that the delivery agent is capable of installing the item), criminal history, medical history, education, etc. The flow continues at block 906.

At block 906, information regarding the delivery is transmitted. For example, the certification system transmits the information regarding the delivery to the portable devices. The information regarding the delivery includes the set of restrictions (if determined by the certification system) as well as information relevant to delivery of the package (e.g., addresses, timing requirements, preferences, etc.). The flow continues at block 908.

At block 908, information regarding the delivery is received. For example, the portable devices can receive the information regarding the delivery. The flow continues at block 910.

At block 910, acceptance of the delivery is transmitted. For example, one, or more, of the portable devices transmits the acceptance of the delivery. The acceptance can be delivered to the certification system, the retailer, or both. After receiving the information regarding the delivery, the portable device presents the delivery agent with information about the delivery. The delivery agent reviews the information about the delivery and can choose whether to accept the delivery. In some embodiments, the delivery agent can only accept the delivery if he or she meets the set of requirements (i.e., has the requisite certifications to deliver the package). The flow continues at block 912.

At block 912, an authorization is received. For example, the portable device receives the authorization. The portable device receives the authorization from the certification system and/or the retailer. The authorization is a code or identifier that allows the delivery agent to retrieve the package. For example, the authorization can be a code (an alphabetic code, a numeric code, an alphanumeric code, a two- or three-dimensional barcode (i.e., a quick response ("QR") code), an auditory code, or a transmittable code (e.g., a radiofrequency ("RF") code). The authorization can include information identifying the delivery agent, the retailer, certifications required to deliver the package, delivery information for the package, etc. In some embodiments, the authorization is based on a cryptographic hash. Additionally, the authorization can be unique to the delivery agent and/or the portable device so that only a portable device containing the correct authorization can retrieve the package. The flow continues at block 914.

At block 914, the authorization is presented at a pickup point. For example, the delivery agent can present, via the portable device, the authorization. In some embodiments, the pickup is automated and presentation of the authorization causes delivery of the package to the delivery agent.

Figure 10:
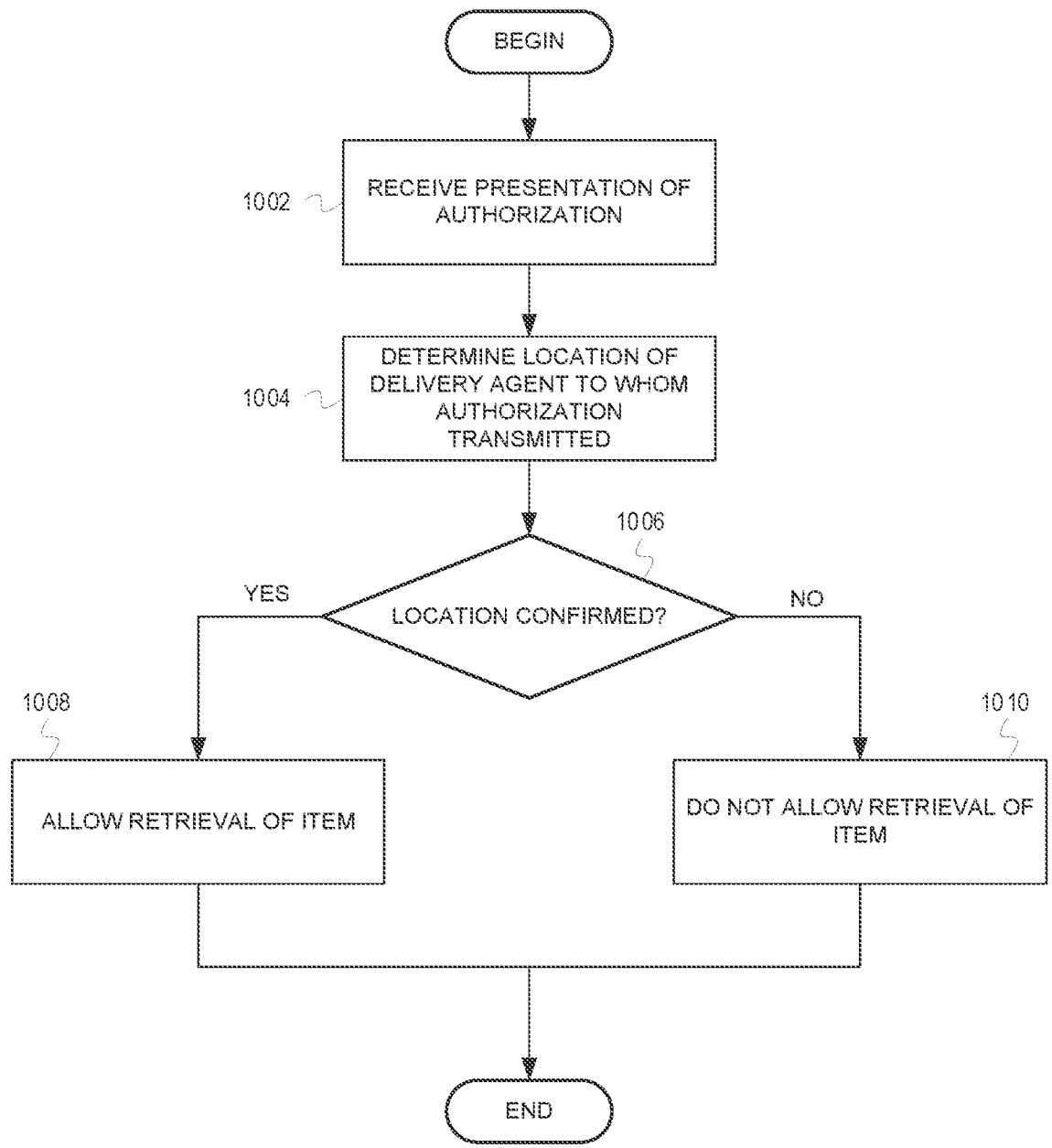
FIG. 10 is a flow diagram depicting example operations for confirming a delivery agent's location, according to some embodiments.

FIG. 10 is a flow diagram depicting example operations for confirming a delivery agent's location, according to some embodiments. In some embodiments, a system for creating a crowdsourced delivery plan for a package includes additional security features. On such feature ensures that a crowdsource delivery agent is in a location suitable to retrieve the item. For example, if the delivery is for a prescription medication, the delivery agent will not be able to retrieve the prescription medication unless he or she is at a specified location, such as a pharmacy. Such authentication may prevent unauthorized persons from electronically imitating a delivery agent (e.g., presenting an authorization that was fraudulently obtained) and retrieving a delivery. The flow begins at block 1002.

At block 1002, a presentation of an authorization is received. For example, a delivery agent can present, via his or her mobile device, the authorization. Because the authorization allows the delivery agent to retrieve the item, it is important to ensure that the person presenting the authorization is indeed the delivery agent. While the authorization provides a certain level of security (i.e., the authorization is only provided to a delivery agent capable of delivering the items), it may be susceptible to imitation. For example, an unauthorized person may steal or otherwise acquire the authorization. The flow continues at block 1004.

At block 1004, the location of the delivery agent to whom the authorization was transmitted is determined. For example, if Delivery Agent A accepted the delivery and in turn received the authorization, the system determines the location of Delivery Agent A. The flow continues at decision diamond 1006.

At decision diamond 1006, the location of the delivery agent to whom the authorization was transmitted is determined. If the location of the delivery agent to whom the authorization was transmitted is confirmed (i.e., the delivery agent is in the proper location to retrieve the item), the flow continues at block 1008. However, if at decision diamond 1006, the location of the delivery agent to whom the authorization was transmitted is not confirmed, the flow continues at block 1010.

At block 1008, retrieval of the item is allowed. Because the location of the delivery agent to whom the authorization was transmitted was confirmed, the delivery agent will be permitted to retrieve the item.

As previously discussed, if at decision diamond 1006, the location of the delivery agent to whom the authorization was transmitted is not confirmed, the flow continues at block 1010. At block 1010, retrieval of the item is not allowed. For example, when the authorization is presented at the pharmacy, Delivery Agent A (from the example above) is not at the pharmacy. Because Delivery Agent A is not at the pharmacy, it is assumed that whoever is presenting the authorization is doing so fraudulently. Consequently, this person will not be permitted to retrieve the item.

Figure 11:
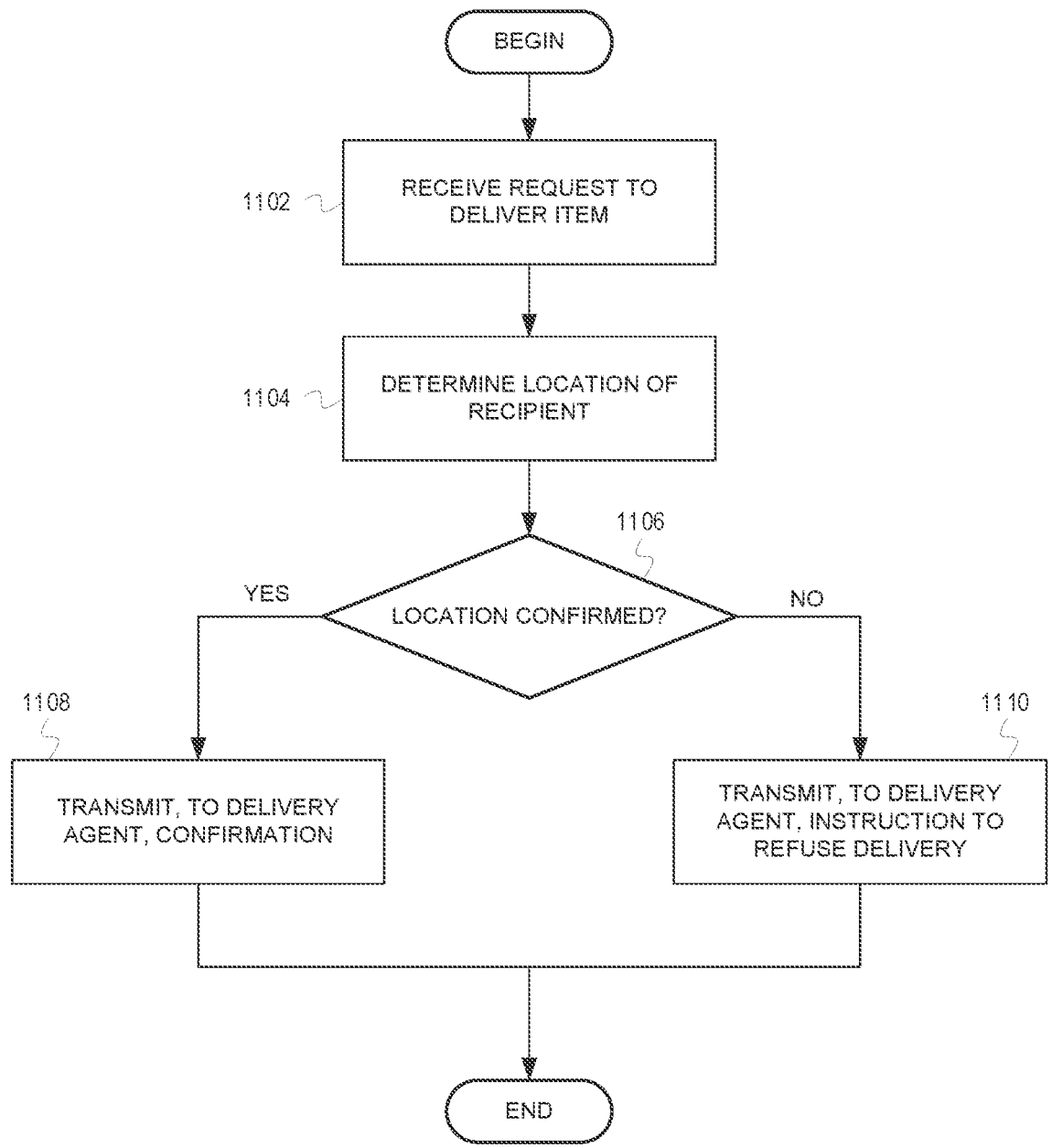
FIG. 11 is a flow diagram depicting example operations for confirming a customer's location, according to some embodiments.

FIG. 11 is a flow diagram depicting example operations for confirming a customer's location, according to some embodiments. As discussed above with respect to FIG. 10, location determination can be used in increase the security, and accuracy, of item delivery. In some embodiments, enhanced security can be provided by ensuring that the customer is near the item when the item is delivered. Such a location determination may prevent packages from being stolen, as well as ensure that the delivery agent is in the correct location when delivering an item. The flow begins at block 1102.

At block 1102, a request to deliver an item is received. For example, a delivery agent can transmit the request to deliver the item via a mobile device. The request can be explicit or implicit (e.g., the request is triggered when an item is scanned for delivery). The flow continues at block 1104.

At block 1104, a location of a recipient is determined. For example, the system determines the location of the person to whom the item is to be delivered. The system can make this determination based, for example, on a location of the recipient's mobile device. The flow continues at decision diamond 1106.

At decision diamond 1106, it is determined whether the recipient is in the delivery location. That is, it is determined whether the recipient's location can be confirmed. The recipient's location is confirmed if the recipient is in the correct location for the delivery (e.g., at his or her home or office, at the delivery location, etc.). If the recipient's location is confirmed, the flow continues at block 1108. However, if the recipient's location is not confirmed, the flow continues at block 1110.

At block 1108, a confirmation is transmitted to the delivery agent. For example, the system can transmit the confirmation to the delivery agent's mobile device. The confirmation indicates that the recipient's location has been confirmed and that the delivery agent can deliver the item.

As previously discussed, if the recipient's location is not confirmed, the flow continues at block 1110. At block 1110, an instruction to refuse delivery is transmitted to the delivery agent. For example, the system can transmit the instruction to refuse delivery to the delivery agent's mobile device. Because the recipient's location has not been confirmed, the delivery agent should not deliver the item.

While the discussion thus far describes retailers delivering to customers, in some embodiments, the system described herein can be used to facilitate deliveries from the customers to the retailer. In other words, the customer takes the role of the retailer in that the customer, for example, via a computer transmits a notification to the system indicating that the customer would like a package to be delivered to the retailer. Such embodiments are useful for returning purchased items, disposing of materials (e.g., hazardous materials), etc.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, a system for creating a crowdsourced delivery plan for a package comprises a certification system, the certification system configured to receive, from a retailer, an indication of items included in the package, determine, based on the indication of items included in the package, a set of requirements, and transmit, to a plurality of portable devices, information regarding the delivery, each of the plurality of portable devices configured to receive, from the certification system, the information regarding the delivery, transmit, to the certification system, an acceptance of the delivery, wherein only ones of the plurality of portable devices associated with delivery agents meeting the set of requirements is capable of acceptance of the delivery, receive, in response to the transmission of the acceptance of the delivery, an authorization, and present, at a pickup point, the authorization.

In some embodiments, a system and a corresponding method performed by the system comprises receiving, at a certification system from a retailer, an indication of items included in a package, determining, based on the indication of the items included in the package, a set of requirements, transmitting, to a plurality of portable devices, information regarding a delivery, receiving, from the certification system, the information regarding the delivery, transmitting, to the certification system, an acceptance of the delivery, wherein only ones of the plurality of portable devices associated with delivery agents meeting the set of requirements is capable of acceptance of the delivery, receiving, in response to the transmission of the acceptance of the delivery, an authorization, and presenting, at a pickup point, the authorization.

What is claimed is:

1. A system for creating a crowdsourced delivery plan for a package, the system comprising:
  a database, wherein the database is configured to store requirements for deliveries;
  a physical retrieval location at a retailer, the retailer controlling access to the package by delivery agents;
  a certification system comprising of one or more processors, the certification system configured to:
  receive, from the retailer electronically, an indication of items included in the package;
  determine, based on the indication of items included in the package and access to the database, a set of requirements required of delivery agents by the retailer, wherein the set of requirements dictate certifications required of delivery agents to deliver the package, the set of requirements for delivery agents determined, at least in part, by including any requirements corresponding to each of the items in the package; and
  transmit, via a communications network to a plurality of mobile devices electronically, information regarding the delivery, wherein the information regarding the delivery includes the physical retrieval location for the items included in the package;
  each of the plurality of mobile devices configured to:
  receive, via the communications network from the certification system electronically, the information regarding the delivery;
  transmit, via the communications network to the certification system electronically, an acceptance of the delivery, wherein only ones of the plurality of mobile devices associated with delivery agents having the required certifications are capable of acceptance of the delivery by referencing a blockchain, wherein the required certifications and the acceptance of the delivery are maintained as data in one or more blocks of the blockchain, wherein each of the one or more blocks contains a cryptographic hash that includes a previous timestamp;

receive, via the communications network electronically in response to the transmission of the acceptance of the delivery, an authorization;

present, at the physical retrieval location, the authorization; and transmit, via the communications network to the certification system, a current location, wherein the current location is a location of one of the plurality of mobile devices;

wherein the certification system is further configured to:

generate, automatically based on transmission of the acceptance of the delivery, the authorization;

transmit, via the communications network, the authorization to a mobile device corresponding to a delivery agent who will make the delivery;

receive the authorization at the retailer upon presentation of the authorization by the delivery agent who will make the delivery;

determine, based on a comparison of the physical retrieval location at the retailer with the current location of the mobile device of the delivery agent who will make the delivery upon presentation of the authorization, whether the current location is consistent with the physical retrieval location; and in response to a determination that the current location is consistent with the physical retrieval location, allow the delivery agent who will make the delivery to physically retrieve the items included in the package; and in response to a determination that the current location is not consistent with the physical retrieval location, prohibit physical retrieval of the items included in the package.

2. The system of claim 1, wherein the certification system is further configured to:

determine, from a list of delivery agents based on the set of requirements, the delivery agents meeting the set of requirements, wherein the transmission of the information regarding the delivery is only to the ones of the plurality of mobile devices associated with the delivery agents meeting the set of requirements.

3. The system of claim 1, wherein each of the plurality of mobile devices is further configured to:

determine whether a delivery agent associated with one of the plurality of mobile devices meets the set of requirements; and if the delivery agent associated with the one of the plurality of mobile devices meets the set of requirements, present, via the one of the plurality of mobile devices, the information regarding the delivery; and if the delivery agent associated with the one of the plurality of mobile devices does not meet the set of requirements, not present the information regarding the delivery.

4. The system of claim 1, wherein each of the delivery agent has one or more certifications, and wherein the set of requirements includes specific required certifications.

5. The system of claim 4, wherein the certifications include one or more of age, ratings, ability to use one or more of the items, ability to install one or more of the items, criminal history, medical history, type of vehicle used for delivery, length of delivery experience, and education.

6. The system of claim 1, wherein the authorization is based on a hash.

7. The system of claim 6, wherein the authorization is a code.

8. The system of claim 1, wherein each of the plurality of mobile devices includes an application associated with the certification system.

9. The system of claim 1, wherein the retailer includes a customer of the retailer.

10. The system of claim 1, wherein the certification system is further configured to:

receive, from a delivery agent associated with one of the plurality of mobile devices, a request to deliver the package; and determine a location of the delivery agent associated with the one of the plurality of mobile devices, wherein if the location of the delivery agent associated with the one of the plurality of mobile devices is confirmed, transmit, to the delivery agent associated with the one of the plurality of mobile devices, a confirmation;

if the location of the delivery agent associated with the one of the plurality of mobile devices is not confirmed, transmit, to the delivery agent associated with the one of the plurality of mobile devices, an instruction to refuse delivery.

11. A method, performed by one or more processors, for creating a crowdsourced delivery plan for a package, the method comprising:

storing, in a database, requirements for deliveries;

providing a physical retrieval location at a retailer, the retailer controlling access to the package by delivery agents;

receiving, at a certification system from the retailer electronically, an indication of items included in the package;

determining, based on the indication of items included in the package and access to the database, a set of requirements required of delivery agents by the retailer, wherein the set of requirements dictate certifications required of delivery agents to deliver the package, the set of requirements for delivery agents determined, at least in part, by including any requirements corresponding to each of the items in the package;

transmitting, via a communications network to a plurality of mobile devices electronically, information regarding the delivery, wherein the information regarding the delivery includes the physical retrieval location for the items included in the package;

receiving, via the communications network from the certification system electronically, the information regarding the delivery;

transmitting, via the communications network to the certification system electronically, an acceptance of the delivery, wherein only ones of the plurality of mobile devices associated with delivery agents having the required certifications are capable of acceptance of the delivery by referencing a blockchain, wherein the required certifications and the acceptance of the delivery are maintained as data in one or more blocks of the blockchain, wherein each of the one or more blocks contains a cryptographic hash that includes a previous timestamp;

generating, by the certification system automatically based on transmission of the acceptance of the delivery, an authorization;

transmitting, by the certification system via the communications network, the authorization to a mobile device corresponding to a delivery agent who will make the delivery;

receiving, via the communications network electronically in response to the transmission of the acceptance of the delivery, the authorization at the retailer upon presentation of the authorization by the delivery agent who will make the delivery;

transmitting, via the communications network to the certification system, a current location, wherein the current location is a location of one of the plurality of mobile devices;

determining, by the certification system based on a comparison of the physical retrieval location at the retailer with the current location of the mobile device of the delivery agent who will make the delivery upon presentation of the authorization, whether the current location is consistent with the physical retrieval location; and in response to a determination that the current location is consistent with the physical retrieval location, allowing the delivery agent who will make the delivery to physically retrieve the items included in the package; and in response to a determination that the current location is not consistent with the physical retrieval location, prohibiting physical retrieval of the items included in the package.

12. The method of claim 11, further comprising:

determining, by the certification system from a list of delivery agents based on the set of requirements, the delivery agents meeting the set of requirements, wherein the information regarding the delivery is only transmitted to the ones of the plurality of mobile devices associated with the delivery agents meeting the set of requirements.

13. The method of claim 11, further comprising:

determining, by each of the plurality of mobile devices, whether a delivery agent associated with one of the plurality of mobile devices meets the set of requirements; and if the delivery agent associated with the one of the plurality of mobile devices meets the set of requirements, presenting, via the one of the plurality of mobile devices, the information regarding the delivery; and if the delivery agent associated with the one of the plurality of mobile devices does not meet the set of requirements, not presenting the information regarding the delivery.

14. The method of claim 11, wherein each of the delivery agents has one or more certifications, and wherein the set of requirements includes specific required certifications.

15. The method of claim 14, wherein the certifications include one or more of age, ratings, ability to use one or more of the items, ability to install one or more of the items, criminal history, medical history, type of vehicle used for delivery, length of delivery experience, and education.

16. The method of claim 11, wherein the authorization is based on a hash.

17. The method of claim 16, wherein the authorization is a code.

18. The method of claim 11, wherein each of the plurality of mobile devices includes an application associated with the certification system.

19. The method of claim 11, wherein the retailer includes a customer of the retailer.

20. The method of claim 11, further comprising:

receiving, from a delivery agent associated with one of the plurality of mobile devices, a request to deliver the package; and determining a location of the delivery agent associated with the one of the plurality of mobile devices, wherein
if the location of the delivery agent associated with the one of the plurality of mobile devices is confirmed, transmitting, to the delivery agent associated with the one of the plurality of mobile devices, a confirmation;

if the location of the delivery agent associated with the one of the plurality of mobile devices is not confirmed, transmitting, to the delivery agent associated with the one of the plurality of mobile devices, an instruction to refuse delivery.

21. The system of claim 1, wherein controlled access to the package at the retrieval location is automated and the package is automatically delivered to the delivery agent in response to presentation of the authorization.

22. The system of claim 1, wherein the certification system is further configured to:

determine a current location of an intended recipient of the package;

in response to a determination that the current location of the intended recipient is consistent with a location for delivery of the package, transmit a confirmation to the delivery agent to deliver the package; and in response to a determination that the current location of the intended recipient is not consistent with the location for delivery of the package, transmit an instruction to the delivery agent to not proceed with delivery of the package.

* * * * *